Nov. 6, 1962   B. O. AYERS   3,062,038
CHROMATOGRAPHIC ANALYZER
Filed Jan. 27, 1958   2 Sheets-Sheet 1
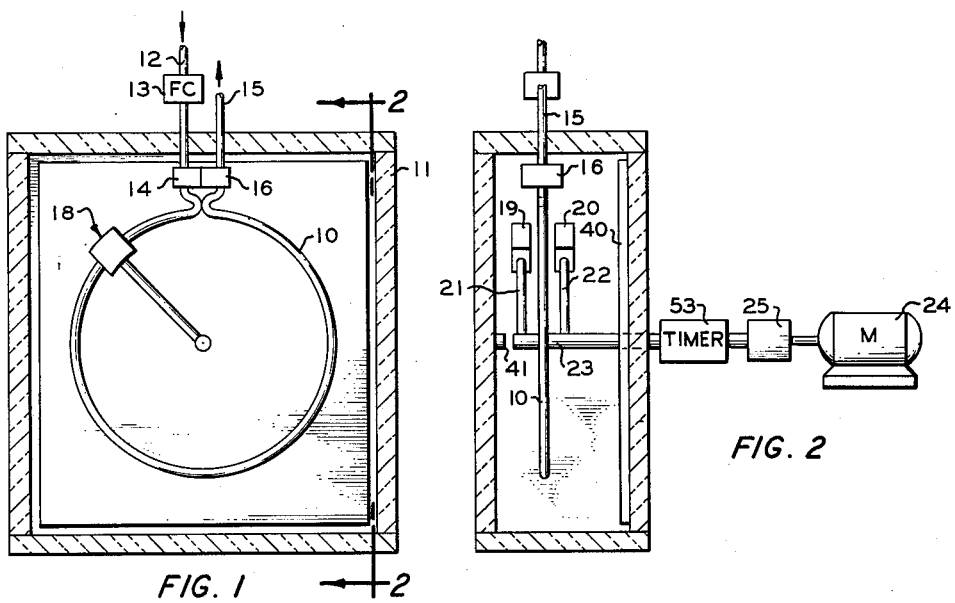
FIG. 1
FIG. 2
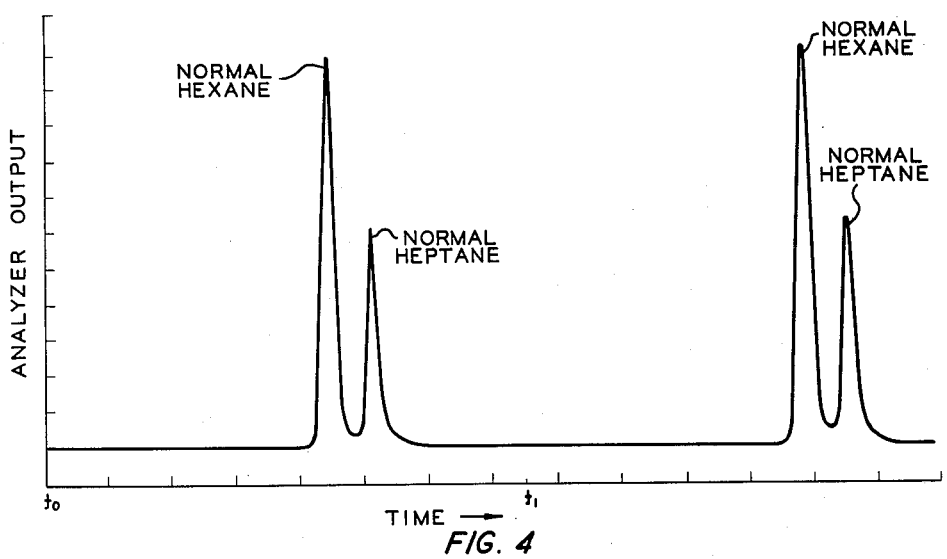
FIG. 4
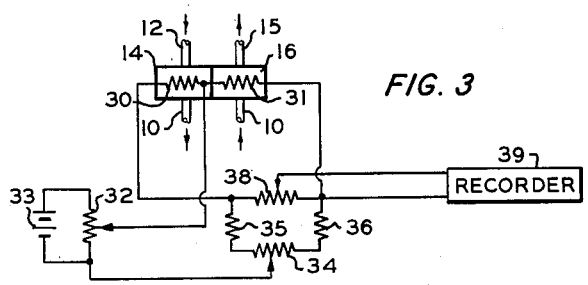
FIG. 3
INVENTOR.
B.O. AYERS
BY *Hudson & Young*
ATTORNEYS

United States Patent Office 3,062,038
Patented Nov. 6, 1962

3,062,038
CHROMATOGRAPHIC ANALYZER
Buell O. Ayers, Bartlesville, Okla., assignor to Phillips Petroleum Company, a corporation of Delaware
Filed Jan. 27, 1958, Ser. No. 711,523
7 Claims. (Cl. 73—23)

This invention relates to the analysis of fluid streams to detect constituents or groups of constituents present therein.

In various industrial and laboratory operations there is a need for analysis procedures which are capable of measuring the concentrations of constituents of fluid mixtures. The present invention provides novel apparatus employing principles of chromatography to meet this need. In accordance with one embodiment of this invention, a thermochromatographic analyzer is formed by an elongated conduit of circular configuration which contains a material that selectively retards passage therethrough of the constituents of a fluid mixture to be analyzed. A fluid sample to be analyzed is introduced into one end of the conduit so as to flow therethrough and a heating element is rotated around the conduit in the direction of fluid flow. This procedure serves to elute the constituents of the fluid mixture in sequence. Analysis means are provided to measure a property of the effluent from the conduit which is representative of the composition thereof. This analysis means preferably comprises thermal conductivity cells disposed in both the inlet and the outlet of the conduit. Such a thermochromatographic analyzer provides a sharp separation between individual constituents and groups of constituents.

In accordance with a second embodiment of this invention, the effluent from a thermachromatographic column is directed to the inlet of a column which is operated in accordance with the principles of elution chromatography. The first column serves to concentrate the constituents to be detected, and the second column provides a detailed analysis of the concentrations of these constituents. The thermochromatographic column can also be employed as a fractionator to separate a group of constituents of interest from other constituents prior to detailed analysis by the second column.

Accordingly, it is an object of this invention to provide an improved analyzer to detect the constituents of fluid mixtures.

Another object is to provide an analysis system which incorporates a thermochromatographic column and an elution chromatographic column to detect the constituents of fluid mixtures.

A further object is to provide an improved chromatographic analyzer which is capable of continuous operation to analyze fluid sample streams.

Other objects, advantages and features of this invention should become apparent from the following detailed description which is taken in conjunction with the accompanying drawing in which:

FIGURE 1 is a view, shown partially in section, of the thermochromatographic analyzer of this invention.

FIGURE 2 is a view taken along line 2—2 in FIGURE 1.

FIGURE 3 is a schematic circuit drawing of the thermal conductivity cell measuring apparatus employed in the analyzer of FIGURE 1.

FIGURE 4 is a graphical representation of a chromatographic record.

Figure 5:
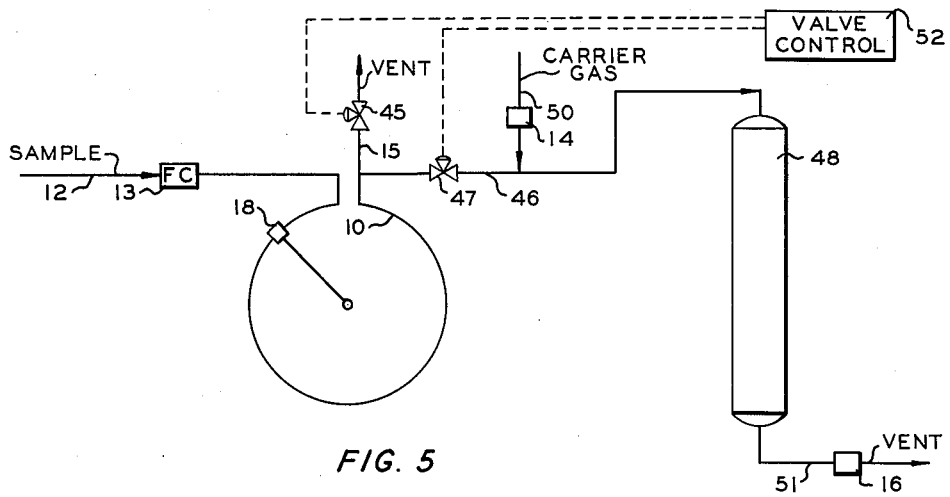
FIGURE 5 is a schematic view of a second embodiment of the analyzer of this invention which incorporates both thermochromatographic and elution chromatographic columns.

Referring now to the drawing in detail, and to FIGURES 1 and 2 in particular, there is shown an elongated conduit 10 of circular configuration which is disposed within a housing 11 formed of heat insulating material. An inlet conduit 12, having a flow controller 13 and a thermal conductivity cell 14 disposed therein, communicates with the first end of conduit 10. An outlet conduit 15, having second thermal conductivity cell 16 therein, communicates with the second end of conduit 10. Conduit 10 is filled with a material which selectively retards passage therethrough of the constituents of a fluid mixture to be analyzed. This column can be filled with an adsorbent material, such as silica gel, alumina or charcoal, or with an inert solid, such as pulverized brick which is coated by a solvent such as hexadecane or benzyl ether. A fluid mixture to be analyzed, either alone or mixed with a carrier gas, such as helium, hydrogen, nitrogen, air or argon, is introduced into the system through conduit 12. A heating element 18 comprises two plates 19 and 20 which are mounted adjacent conduit 10 by means of respective supports 21 and 22 which extend from a shaft 23 that is coaxial of the axis of the circle formed by conduit 10. Heating element 18 is rotated about conduit 10 by rotation of shaft 23 which is connected to the drive shaft of a motor 24 through speed reduction gears 25. It should be evident that other configurations of heating element, such as a U-shaped element, for example, can be employed.

In order to describe the operation of the analyzer, it is assumed that heating element 18 initially is positioned adjacent the inlet of conduit 10. The most volatile or least strongly adsorbed constituents of the sample stream move rapidly through conduit 10 until they reach portions of the conduit which are cooler than the region adjacent the heating element. The speeds of movement of the constituents are then slowed down due to the decreased volatility or greater adsorption, the more strongly adsorbed constituents tending to be retained in the column at regions of higher temperature nearer the heating element. A separation is thus effected. As the heating element then moves around the column toward the outlet, the individual constituents of the fluid mixture are desorbed and eluted one by one.

The desorbed constituents can be detected by comparing the thermal conductivity of the effluent gas with the thermal conductivity of the sample mixture initially supplied to the column or with the carrier gas. This comparison can be made by means of thermal conductivity cells 14 and 15 and the associated circuit which is illustrated in FIGURE 3. Cells 14 and 15 have respective thermistors 30 and 31 therein which are in thermal contact with the gases flowing through respective conduits 12 and 15, although filament type thermal conductivity cells can also be used. The first terminals of thermistors 30 and 31 are connected to one another and to the contactor of a potentiometer 32. A voltage source 33 is connected across the end terminals of potentiometer 32. One end terminal of potentiometer 32 is connected to the contactor of a potentiometer 34. The first end terminal of potentiometer 34 is connected through a resistor 35 to the second terminal of thermistor 30, and the second end terminal of potentiometer 34 is connected through a resistor 36 to the second terminal of thermistor 31. The end terminals of a potentiometer 38 are connected to the respective second terminals of thermistors 30 and 31. The contactor and one end terminal of potentiometer 38 are connected to the respective input terminals of a recorder 39.

It should thus be evident that thermistors 30 and 31 and the circuit elements associated therewith form a modified Wheatstone bridge network so that the signal applied to recorder 39 is representative of the difference between the thermal conductivities of the gases in contact with respective thermistors 30 and 31. Recorder 39 thus provides a signal which indicates differences between compositions of the gases flowing through conduits 12 and 15. While a thermal conductivity cell detector is particularly well suited for use in the analyzer of this invention, other types of analyzers can be employed to detect the difference in composition of the gases flowing through conduits 12 and 15. Examples of such analyzers include glow discharge tubes, differential refractometers, infrared analyzers and ultraviolet analyzers.

It is desirable that conduit 10 and thermal conductivity cells 14 and 16 be maintained at a constant temperature except for the region of conduit 10 adjacent heating element 18. This can readily be accomplished by disposing a heating element 40 within housing 11. Heating element 40 can comprise an electrical heater or a conduit through which a heating material can be circulated. The electrical energy or heating material supplied to this element can be regulated by a thermostat 41 to maintain a constant temperature within housing 11. If it is desired to operate the instrument at a temperature below atmospheric, a coolant can be circulated through a conduit in housing 40.

As a specific example of the operation of the apparatus of FIGURES 1, 2 and 3, column 10 was constructed of 16 inches of tubing having an inside diameter of 1/4 inch. This column was filled with silica gel pellets. A fluid mixture comprising approximately 95% helium and approximately 5% of a mixture of normal hexane and normal heptane was supplied to the inlet of column 10 at a rate of approximately 30 cubic centimeters per minute. Heater 18 was moved at a velocity of approximately 6 inches per minute and provided a temperature gradient of 5° F. per inch with a maximum temperature of 200° F. The output signal of the bridge network is plotted as a function of time in the curve of FIGURE 4. It can be seen that normal hexane is eluted first, followed by normal heptane.

In FIGURE 5 there is shown a second embodiment of the analyzer of this invention which is particularly well suited for use in measuring extremely small concentrations of constituents of fluid mixtures or for fractionating complex fluid samples. The analyzer of FIGURE 5 employs a first conduit 10 which corresponds to the conduit 10 of FIGURE 1. A control valve 45 is disposed in vent conduit 15. A conduit 46, having a control valve 47 therein, communicates between conduit 15 upstream from valve 45 and the inlet of an elution chromatographic column 48. Column 48 comprises an elongated conduit which is filled with either an adsorbent or a supported liquid of the type previously described. A conduit 50, having a thermal conductivity cell 14 disposed therein, communicates with conduit 46 downstream from valve 47 to permit the introduction of a carrier gas into the inlet of column 48. A vent conduit 51, having a second thermal conductivity cell 16 disposed therein, communicates with the outlet of column 48. Valves 45 and 47 are actuated by a valve control means 52 in the manner described hereafter.

A gas sample to be analyzed is introduced into the system through conduit 12 so as to pass through conduit 10. Valve 47 initially is closed and valve 45 is open so that the effluent from conduit 10 is vented through conduit 15. Heating element 18 is rotated around conduit 10 to elute the constituents of the fluid mixture in the manner previously described. At the time the constituents of interest appear in the effluent from conduit 10, valve 47 is opened and valve 45 is closed. This directs the effluent from conduit 10 to the inlet of column 48 so as to form the sample mixture. Column 48 operates as a conventional elution chromatographic analyzer wherein the constituents of the sample are selectively adsorbed within the column and appear in the effluent as individual constituents. The thermal conductivity cells provide an indication of the appearance of these constituents in the effluent. Valve control means 52 can comprise a timer 53 which is connected to drive shaft 23 in FIGURE 2. This timer can be in the form of cams which are rotated by shaft 23 to open and close switches which control the opening and closing of valves 45 and 47. In this manner, the effluent from conduit 10 is transferred to column 48 when heating element 18 is located adjacent a predetermined region of conduit 10. If desired, additional thermal conductivity cells can be associated with conduit 10 in the manner illustrated in FIGURE 1 and the output signal from the bridge circuit associated with these additional cells can perform the switching operation when a predetermined differential exists between the thermal conductivities of the gases flowing into and out of conduit 10.

Figure 6:
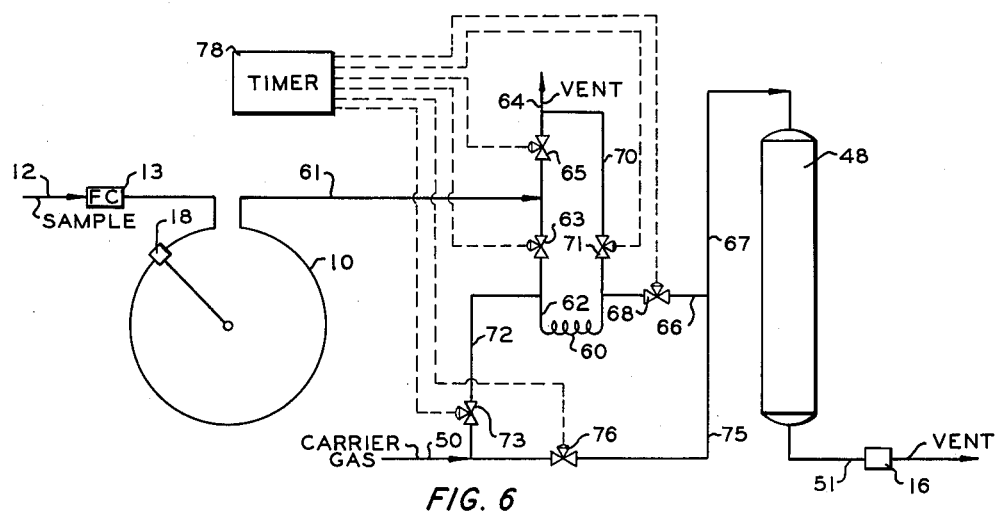
FIGURE 6 is a schematic view of a modified form of the analyzer of FIGURE 5.

In FIGURE 6 there is show a modified form of the analyzer of FIGURE 5 which can be employed to advantage to perform analyses when the time required for an analysis by the elution chromatographic column is greater than the time required for separation within the thermochromatographic column. An elongated conduit 60 forms a chamber in the analyzer of FIGURE 6 to store a sample prior to its introduction into the elution chromatographic column 48. The outlet of conduit 10 is connected by conduits 61 and 62, the latter hving a control valve 63 therein, to the inlet of conduit 60. Conduit 61 is also connected to a vent conduit 64 which has a control valve 65 therein. The outlet of conduit 60 is connected by conduits 61 and 62, the latter having a control valve 68 therein, to the inlet of column 48. The outlet of conduit 60 is also connected by a conduit 70, which has a control valve 71 therein, to vent conduit 64. A conduit 50, which introduces carrier gas into the system, is connected to conduit 62 by means of a conduit 72 which has a control valve 73 therein. A conduit 75, which has a control valve 76 therein, communicates between conduit 50 and conduit 67. Valves 63, 65, 68, 71, 73 and 76 are operated in sequence by a timer 78 which can be of the form illustrated in FIGURE 7.

At the beginning of the analysis cycle, valves 73, 65, 68 and 76 are open and valves 63 and 71 are closed. The carrier thus purges column 48 and the effluent from column 10 is vented through conduit 64. When the constituents to be detected appear in the effluent from conduit 10, valves 63, 76 and 71 are opened and valves 73, 65 and 68 are closed. The effluent from conduit 10 then flows through storage conduit 60. During the next sequence of operation, valves 65 and 76 are opened and valves 63, 73, 68 and 71 are closed. This traps the sample in conduit 60. At a later time, when column 48 has been purged by the carrier gas from the previous cycle, valves 73, 65 and 68 are open and valves 63, 76 and 71 are closed. The carrier gas then directs the sample from conduit 60 into column 48.

Figure 7:
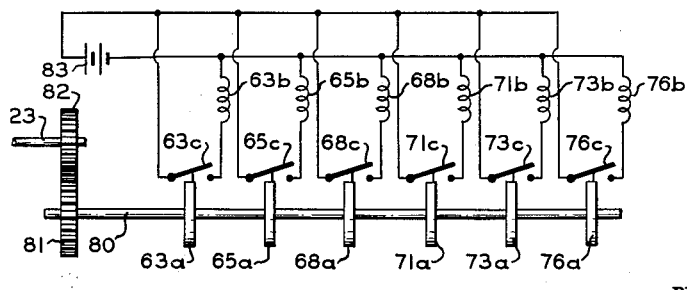
FIGURE 7 is a schematic view of the timer of FIGURE 6.

The timer 78 is illustrated in FIGURE 7. A plurality of cams 63a, 65a, 68a, 71a, 73a and 76a are mounted on a shaft 80 which carries a gear 81 that meshes with a gear 82 on shaft 23 of FIGURE 2. Gears 82 and 81 are proportioned so that shaft 80 makes one revolution for an integral number of revolutions of shaft 23. Shaft 80 can thus revolve once for each second or third revolution of shaft 23, for example. Valves 63, 65, 68, 71, 73 and 76 of FIGURE 6 are of the type which are opened when respective solenoids 63b, 65b, 68b, 71b, 73b and 76b are energized. These solenoids are connected to a current source 83 through respective switches 63c, 65c, 68c, 71c, 73c and 76c. The switches are in turn opened and closed by the associated cams which are designed to open and close the valves in the sequence above described. The cams are designed so that sufficient time is permitted for column 48 to become purged and for the desired sample to be trapped in conduit 60.

In view of the foregoing disclosure it should be evident that there is provided in accordance with the invention improved analyzer systems which employ the principles of chromatography. The novel thermochromatographic analyzer of this invention permits rapid analyses to be made of fluid mixtures. The combination of thermochromatographic and elution chromatographic analyzers permits the detection of extremely small concentrations of constituents of fluid mixtures or the separation of complex mixtures.

While the invention has been described in conjunction with present preferred embodiments, it should be evident that it is not limited thereto.

What is claimed is:

1. Apparatus for analyzing a fluid mixture comprising a first conduit filled with a material which selectively retards passage therethrough of the constituents of a fluid mixture to be analyzed, means to introduce a fluid mixture to be analyzed into a first end of said first conduit, a second conduit filled with a material which selectively retards passage therethrough of the constituents of a fluid mixture to be analyzed, a storage chamber, first conduit means to connect the second end of said first conduit selectively to the inlet of said storage chamber, second conduit means to connect the outlet of said storage chamber to the first end of said second conduit, valve means to isolate said chamber from the flow path of said first and second conduits, means to introduce a carrier gas selectively into the inlet of said storage chamber, means to measure a property of the effluent from the second end of said second conduit which is representative of the composition thereof, a heating element, and means to move said heating element adjacent said first conduit from the first to the second end thereof.

2. The apparatus of claim 1 wherein said first conduit is of generally circular configuration.

3. The apparatus of claim 1 wherein said means to measure comprises a first thermistor positioned in said means to introduce a carrier gas, a second thermistor positioned in the effluent from said second conduit, and means to compare the resistances of said thermistors.

4. Apparatus for analyzing a fluid mixture comprising a first conduit filled with a material which selectively retards passage therethrough of the constituents of a fluid mixture to be analyzed, means to continuously introduce a fluid mixture to be analyzed into a first end of said first conduit, a second conduit filled with a material which selectively retards passage therethrough of the constituents of a fluid mixture to be analyzed, first conduit means communicating between the second end of said first conduit and the first end of said second conduit, a first valve in said first conduit means, a vent conduit communicating with said second end of said first conduit, a second valve in said vent conduit, means to introduce a carrier gas into the first end of said second conduit, means to measure a property of the effluent from the second end of said second conduit which is representative of the composition thereof, a heating element, and means to move said heating element adjacent said first conduit from the first to the second end thereof.

5. Apparatus for analyzing a fluid mixture comprising first conduit means filled with a material which selectively retards passage therethrough of the constituents of a fluid mixture to be analyzed, means to introduce a fluid mixture to be analyzed into the first end of said first conduit, a second conduit filled with a material which selectively retards passage therethrough of the constituents of a fluid mixture to be analyzed, a storage chamber, first conduit means communicating between the second end of said first conduit and the inlet of said chamber, a first valve in said first conduit means, second conduit means communicating between the outlet of said chamber and the first end of said second conduit, a second valve in said second conduit means, third vent conduit means communicating with the second end of said first conduit, a third valve in said third conduit means, fourth vent conduit means communicating with the outlet of said chamber, a fourth valve in said fourth conduit means, fifth conduit means communicating with the inlet of said chamber to introduce a carrier gas, a fifth valve in said fifth conduit means, sixth conduit means communicating with the first end of said second conduit to introduce a carrier gas, a sixth valve in said sixth conduit means, means to measure a property of the effluent from the second end of said second conduit which is representative of the composition thereof, a heating element, a means to move said heating element adjacent said first conduit from the first end to the second end thereof.

6. A method of analyzing a fluid mixture for trace components therein which comprises continuously passing a fluid mixture to be analyzed into a first selective thermochromatographic sorbent zone, concentrating said trace components and simultaneously moving said components through said sorbent zone by progressively heating sections of said first zone from the inlet to the outlet thereof, passing the concentrated trace components to a second selective zone, venting the remainder of the effluent from said first zone, passing a carrier gas to the inlet of said second zone and measuring a property of the effluent from said second zone which is representative of the composition of the trace components therein.

7. Apparatus for analyzing a fluid mixture comprising a first conduit of generally circular configuration filled with material which selectively retards passage therethrough of constituents of a fluid mixture to be analyzed, means to introduce a fluid mixture to be analyzed into a first end of said first conduit, a second conduit filled with material which selectively retards passage therethrough of the constituents of a fluid mixture to be analyzed, conduit means communicating between the second end of said first conduit and the first end of said second conduit, means to introduce a carrier gas into the first end of said second conduit, means to measure a property of the effluent from the second end of said second conduit which is representative of a composition thereof, a heating element, a shaft coaxial of the axis of the circle formed by said conduit, means to rotate said shaft, and a support carried by such shaft and extending therethrough to position said heating element adjacent said first conduit.

References Cited in the file of this patent

UNITED STATES PATENTS 2,398,818     Turner _____ Apr. 23, 1946
2,868,011     Coggeshall _____ Jan. 13, 1959

OTHER REFERENCES

Article: N. M. Turkeltaub et al., published in Zavodskaya Lab., vol. 23, pages 1120–1124, September 1957. (Abstract print. Chemical Abstracts, 53, 5767 (1959).)

Article: "Analysis and Control of Refinery Gas Streams," by C. Rouit, published in Vapor Phase Chromatography, book by Desty, Butterworth, Scientific Publ., London, 1956, pages 295–302.

Article: "Apparatus for the Continuous Analysis of Gases," by Zhukovitskii and Turkeltaub, published in Zavodskaya Lab., vol. 22, 1956, pages 1252–1255.

Publication: "Vapor Fractometry," H. H. Hausdorff (Perkin Elmer Corp.), Norwalk, Conn., September 1955, pages 2, 8.

"Gas Partition Analysis of Light Ends in Gasolines," by Lichtenfels et al., published in Analytical Chemistry, vol. 28, page 1376, September 1956.

Books: Gas Chromatography, Keulemans, Reinhold Publishing Co., New York, 1957, page 186.

Gas Chromatography, Philips, Academic Press Inc., New York, 1956, page 84.